United States Patent
Ito et al.

(10) Patent No.: US 7,342,867 B2
(45) Date of Patent: Mar. 11, 2008

(54) OPTICAL HEAD DEVICE, OPTICAL RECORDING DEVICE, AND OPTICAL RECORDING METHOD

(75) Inventors: Tatsuo Ito, Osaka (JP); Teruhiro Shiono, Osaka (JP); Hiroaki Yamamoto, Inagawa-cho (JP); Seiji Nishino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 54 days.

(21) Appl. No.: 10/509,097

(22) PCT Filed: Dec. 2, 2003

(86) PCT No.: PCT/JP03/15372

§ 371 (c)(1),
(2), (4) Date: Sep. 27, 2004

(87) PCT Pub. No.: WO2004/051635

PCT Pub. Date: Jun. 17, 2004

(65) Prior Publication Data

US 2005/0174920 A1    Aug. 11, 2005

(30) Foreign Application Priority Data

Dec. 3, 2002    (JP) .............................. 2002-351064

(51) Int. Cl.
*G11B 7/135*  (2006.01)
*G11B 7/00*  (2006.01)

(52) U.S. Cl. .............................. 369/112.01; 369/44.11; 369/116

(58) Field of Classification Search .................. 369/44, 369/116

See application file for complete search history.

(56) References Cited

U.S. PATENT DOCUMENTS

| 4,283,785 A * | 8/1981 | Miyauchi et al. ............ 369/116 |
| 5,657,307 A * | 8/1997 | Taneya et al. ............... 369/116 |
| 6,381,074 B2 * | 4/2002 | Yoshida ...................... 359/661 |
| 7,226,443 B1 * | 6/2007 | Campin et al. ................. 606/5 |
| 2002/0024736 A1 * | 2/2002 | Itou ........................... 359/578 |
| 2002/0060958 A1 * | 5/2002 | Ando et al. .............. 369/44.23 |

FOREIGN PATENT DOCUMENTS

JP    2000-182254    6/2000

* cited by examiner

*Primary Examiner*—Wayne Young
*Assistant Examiner*—Parul Gupta
(74) *Attorney, Agent, or Firm*—Wenderoth, Lind & Ponack, L.L.P.

(57) ABSTRACT

An object of the present invention is to acquire optimum recording characteristics of an optical recoding medium having multiple data layers, with respect to each of the multiple data layers without increasing learning time required for learning a relation between aberration amount and optimum recording compensation with respect to each of the multiple data layers. The present invention includes a wavefront converter which is driven in such a manner as to reduce the aberration amount detected by an aberration detector. An output controller holds learned data as to the relation between the driving amount of the wavefront converter and the output of a light source, and controls the output of the light source based on the driving amount of the wavefront converter and the learned data.

21 Claims, 9 Drawing Sheets

OPTICAL HEAD DEVICE, OPTICAL RECORDING DEVICE, AND OPTICAL RECORDING METHOD

TECHNICAL FIELD

The present invention relates to an optical head device, an optical recording device, and an optical recording method for recording and/or erasing information on an optical medium or an opto-magnetic medium such as an optical disk or an optical card, and particularly to an optical head device, an optical recording device, and an optical recording method suitable for recording and/or erasing data on an optical recording medium having multiple data layers (e.g., a multi-layered optical disk or a multi-layered optical card).

BACKGROUND ART

There has been developed use of a light source of a shorter wavelength, and a focusing lens having a larger numerical aperture (hereinafter, simply called as "NA") in order to increase the recording capacity of an optical disk. The wavelength of the light source and NA of the focusing lens used in DVDs are generally 650 nm and 0.6, respectively. There has been proposed an optical system for optical disks of future generation in which the wavelength of the light source is 405 nm, and NA of the focusing lens is 0.85. Technology is being developed regarding multi-layered optical disks constructed such that a number of data layers are laminated one over another at a certain interval in the thickness of the optical disk in an attempt to further increase the recording capacity of the optical disk.

Increase of NA of a focusing lens may resultantly increase spherical aberration relative to a variation (unevenness) in thickness of a substrate of an optical disk. The thickness of the substrate herein means a thickness of the substrate from the light receiving plane of the optical disk to the recording layer thereof. Since spherical aberration due to substrate thickness variation is proportional to the fourth power of NA, a spherical aberration of 10 mλ (=0.01 λ) is generated as the substrate thickness is varied by 1 μm in the optical system in which the wavelength of the light source is 405 nm, and NA of the focusing lens is 0.85. A coma aberration, which is generated by tilting of the optical disk relative to the optical axis of the focusing lens, is increased, as NA is increased, even with the same tilting amount. A spherical aberration or a coma aberration may degrade data recording characteristics. Accordingly, it is a common practice to detect an aberration of a light spot focused by the focusing lens, and control the output of the light source so as to compensate for the recording characteristics. This conventional art is disclosed, for example, in Japanese Unexamined Patent Publication No. 2001-160233 (patent document 1).

There has been known, as a method for detecting spherical aberration, a technology of dividing received light reflected from an optical disk into several areas on a cross-sectional flat plane of the light beam, and detecting a focus error signal with respect to each of the areas to calculate aberration. This technology is disclosed, for example, in Japanese Unexamined Patent Publication No. 2000-182254 (patent document 2).

Regarding coma aberration, there has been known a technology of detecting tilting of an optical disk with use of a tilt sensor provided in an optical head device, and calculating aberration based on the detection result. Regarding a multi-layered optical disk provided with multiple data layers, there is proposed an arrangement in which an aberration compensator is provided to compensate for spherical aberration with respect to each of the data layers, in light of the fact that the substrate thicknesses differ from each other with respect to the data layers. Examples of the aberration compensator are: the one in which a transparent plate member is provided between the focusing lens and the optical disk for compensating spherical aberration; the one in which wedge-like transparent blocks are assembled together to set the optical path length from the focusing lens to the respective data layers identical; and the one in which a diverging lens and a converging lens are arranged at respective appropriate positions between the focusing lens and the collimator lens for making laser beams from the light source into parallel light beams, and the distance between the diverging and converging lenses is rendered variable by a voice coil motor for compensating spherical aberration. These aberration compensators are, for example, disclosed in Japanese Patent No. 2502884 (patent document 3).

The working distance corresponding to the distance between the focusing lens and the optical disk is from 0.2 to 0.6 mm when NA of the lens to be used is 0.85. Therefore, it is difficult to arrange a plate member or wedge-like blocks between the focusing lens and the optical lens, considering vertical displacement of the optical disk arising from rotation of the optical disk, or vibrations exerted from the outside. In view of this, there is generally provided an aberration compensator between the collimator lens and the focusing lens. In the arrangement, recording characteristics of the multi-layered optical disk are corrected by compensating the spherical aberration with respect to each of the data layers before controlling the output of the light source based on the detected aberration amounts.

Aberration correcting means such as an aberration compensator for compensating the aberration with respect to each of the data layers is required in the optical head device for use in recording/reproducing data on an optical disk having multiple data layers. The aberration correcting means is adapted to reduce the aberration, which is supposed to be generated in applying the focusing lens designed such that the aberration is set to 0 with respect to a specific substrate thickness, to a data layer having a substrate thickness different from the specific substrate thickness. The aberration correcting means is driven to minimize the aberration amount detected by the aberration detecting means provided in the optical head device. Let us assume an arrangement in which a third-order spherical aberration is to be detected, and the aberration correcting means is so designed as to reduce such a third-order spherical aberration. Such an arrangement makes it possible to set the third-order spherical aberration to 0 with respect to any data layer by controlling the aberration correcting means to make laser light incident on the focusing lens into converging light or diverging light. Despite such a merit, however, the above arrangement fails to set the total aberration including aberration of the fifth and higher orders to 0, with the total aberrations with respect to the data layers being different from each other. In this way, if the above proposed arrangement regarding aberration detection and aberration reduction is applied to the multi-layered optical disk having multiple data layers, a detected aberration amount and an actual aberration amount are different from each other. A similar drawback should be considered, as the order of aberration to be detected is raised from the fifth order to the seventh order or the like, as long as undetectable aberration of a higher order remains. Therefore, the recording characteristics compensating method in which the output of the light source is controlled based on the detected aberration amount, as having been employed in the conventional art, fails to carry out optimum recording characteristics compensation, because output control is not executed when the detected aberration amount of a low order is 0 although there actually remain aberrations of a higher order which are different from each other with respect to the data layers. Furthermore, according to the conventional method, information is required as to the layer number of the target data layer, in addition to information relating to the detected aberration amount, and it is required to optimize the recording power based on such information. Thus, the conventional arrangement not only necessitates a program for learning a relation between the aberration amount and the optimum recording power with respect to each of the data layers, and for storing the learning results, but also makes the program complicated.

More specifically, if the aberration detecting means for detecting the third-order spherical aberration is used, and aberration correction is implemented with use of the aberration compensator based on the third-order spherical aberration amount detected by the aberration detecting means in recording/reproducing data on the first data layer and the second data layer whose distances from the optical disk surface (light receiving plane) are different from each other, it is more likely that a relation between the detected third-order spherical aberration amount and the optimum recording compensation amount, namely, correction residual with respect to the data layers may be varied from each other.

FIG. 11 shows a relation between substrate thickness variation, and third-order spherical aberration, and total aberrations, based on the substrate thickness of the optical disk as a parameter. The total aberration herein means aberration including third-order spherical aberration and aberration of the order higher than the third order. In FIG. 11, the aberration is compensated by the aberration compensator such that the third-order spherical aberration is 0 when the substrate thickness variation is 0. The substrate thickness variation in FIG. 11 is a variation relative to the respective initial thicknesses of the first and second data layers (e.g., 100 μm for the first data layer, and 110 μm for the second data layer), i.e., a relative value in thickness. Furthermore, the variation is not an average of thickness variation, as represented by "rms" or a like unit, but is an instantaneous value. As is obvious from FIG. 11, aberration amounts of the order higher than the third order are different from each other between the first data layer and the second data layer, although the third-order spherical aberration amounts are identical to each other between the first and second data layers. Even if the aberration detecting means acquires aberration amounts of the higher orders such as the fifth order, seventh order or the like, there still remains a difference in aberration component of the order higher than a highest order detectable by the aberration detecting means between the first and second data layers. Consequently, since the relation between the aberration amount detected by the aberration detecting means, and the optimum recording compensation amount is different from each other with respect to the data layers, it is required to provide a program corresponding to learning means (not shown) that learns a relation between the aberration amount and the optimum recording compensation amount with respect to each of the data layers in advance for recording compensation, and stores the learning results therein. In this way, the technical field of the present invention has encountered problems such as increase of learning hours and increase of the quantity of the program, with increase in the number of data layers.

DISCLOSURE OF THE INVENTION

In view of the above problems, an object of the present invention is to provide an optical head device, an optical recording device, and an optical recording method that enable acquisition of optimum recording characteristics of an optical recording medium having multiple data layers, with respect to each of the multiple data layers without increasing learning hours required for learning a relation between an aberration amount and an optimum recording compensation amount with respect to each of the multiple data layers.

The optical head device according to the present invention is constructed such that output controlling means controls the output of a light source based on a driving amount of wavefront converting means and information relating to a relation between the driving amount and the output of the light source.

These and other objects, features, aspects, and advantages of the present invention will become more apparent upon reading of the following detailed description and accompanying drawing.

BRIEF DESCRIPTION ON OF THE DRAWINGS

BEST MODE FOR CARRYING OUT THE INVENTION

Figure 1:
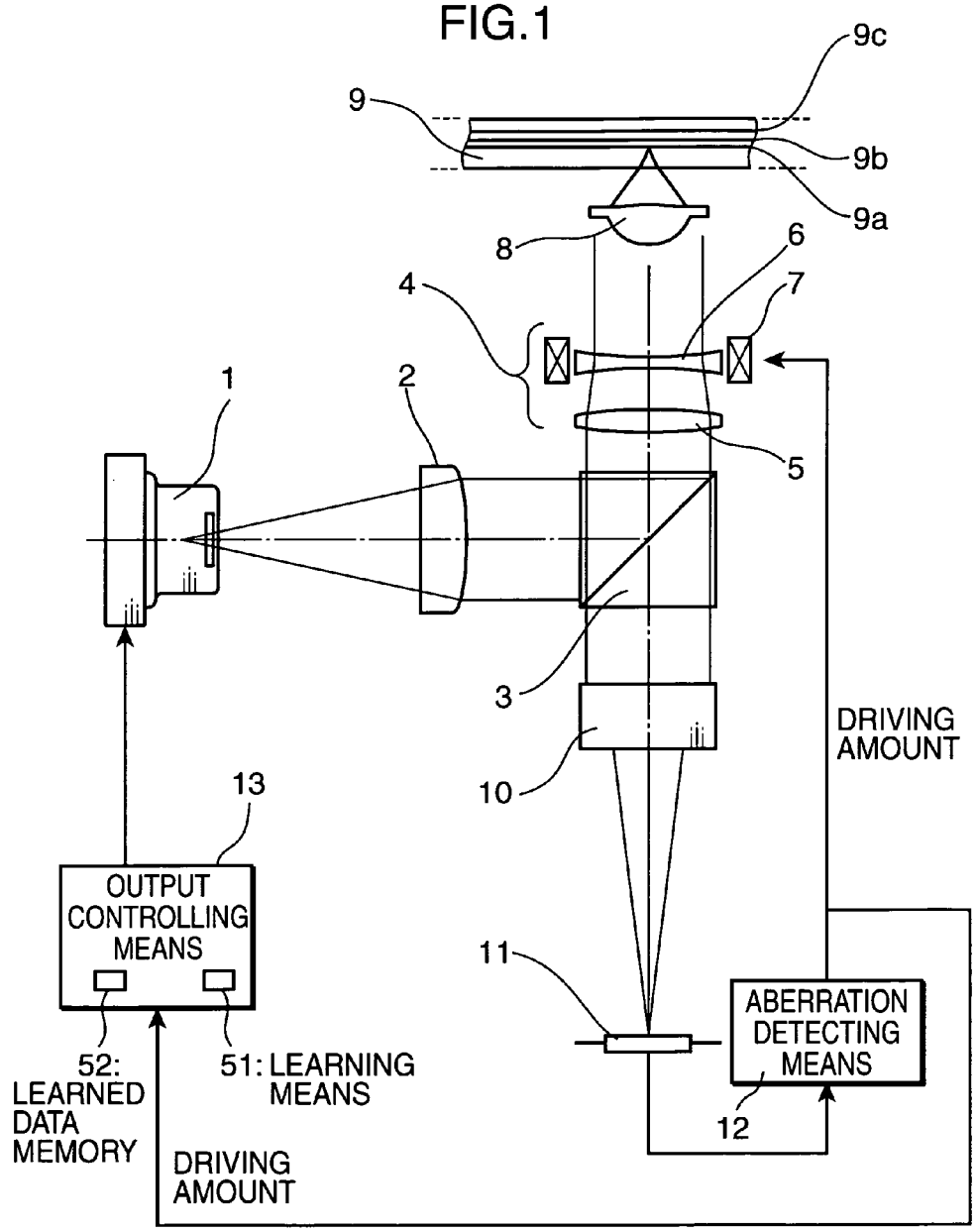
FIG. 1 is an illustration showing an arrangement of an optical head device in accordance with a first embodiment of the present invention.

In the following, preferred embodiments of the present invention are described referring to the drawings.

First Embodiment

FIG. 1 is an illustration showing an arrangement of an optical head device in accordance with a first embodiment of the present invention. The optical head device 101 includes a light source 1, a collimator lens 2, a beam splitter 3, wavefront converting means 4, a focusing lens 8, a detection optical system 10, a light detector 11, aberration detecting means 12, and output controlling means 13. The light source 1 is preferably a semiconductor laser which emits laser light of wavelength 405 nm. The collimator lens 2 is adapted to make the laser light emitted from the light source 1 to parallel beams. The beam splitter 3 is adapted to split the optical path of light. The wavefront converting means 4 has a converging lens 5, a diverging lens 6, and driving means 7. The driving means 7 is adapted to drive the diverging lens 6. The driving means 7 is preferably a voice coil motor.

An optical recording medium 9 from which or in which data is to be read or written with use of the optical head device 101 has multiple data layers 9a, 9b, 9c. In this embodiment, described is an example where the optical recording medium 9 consists of three layers. It is needless to say that the number of data layers of the optical recording medium 9 to be used by the inventive optical head device is not limited to three. The detection optical system 10 is adapted to focus the reflected light from the optical recording medium 9. The aberration detecting means 12 is adapted to, for example, detect third-order spherical aberration based on a signal detected by the light detector 11, send a driving amount for driving the driving means 7 to the driving means 7 to reduce (e.g., minimize) the detected third-order spherical aberration, and also send the driving amount to output controlling means 13, which will be described later. The output controlling means 13 is adapted to control the output of the light source 1 depending on the driving amount, which is the output from the aberration detecting means 12.

The output controlling means 13 has learning means 51. A relation between the driving amount to be sent from the aberration detecting means 12 to the driving means 7, and an optimum recording power in correspondence thereto has been acquired in advance by the learning means 51, as initial learning. Specifically, the learning means 51 learns how high the intensity of laser light to be incident on the focusing lens 8 is to be adjusted, depending on a variation in substrate thickness regarding each of the data layers 9a, 9b, 9c of the optical recording medium 9, corresponding to a distance between the light receiving plane of the optical recording medium 9 and each of the data layers 9a, 9b, 9c. Information acquired through the learning considering the substrate thickness variation is regarded as information relating to the optimum recording power relative to the total aberration, considering third-order spherical aberration and spherical aberration other than the third-order spherical aberration. The learning means 51 causes, for example, a learned data memory 52 equipped in the output controlling means 13 to store the information acquired through the learning.

The output controlling means 13 is adapted to vary a light emitting duration or peak level of pulse emission, based on the learned data which is the information learned or acquired by the learning means 51, and the driving amount outputted from the aberration detecting means 12, for controlling the recording power of the light source 1. The learning means 51 may acquire the learned data when the optical recording medium 9 having the multiple data layers 9a, 9b, 9c is loaded in the optical head device 101.

The output controlling means 13, or the output controlling means 13 and the aberration detecting means 12 may be constituted by a computer which is operated in accordance with a program stored in a memory such as a Read Only Memory (ROM). The program is suppliable through a recording medium such as an ROM or a CD-ROM, or through a transmission medium such as a network.

Figure 2:
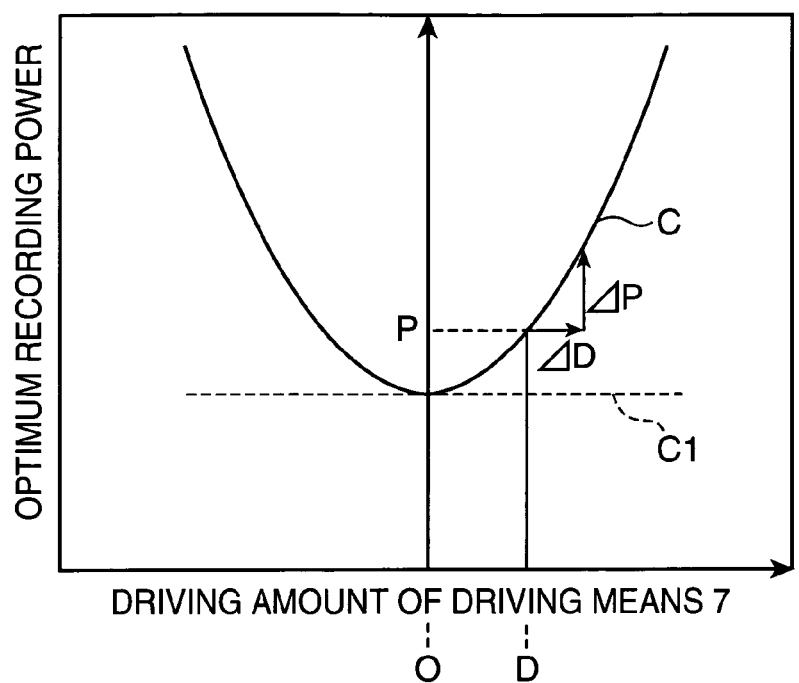
FIG. 2 is a graph showing a relation between a driving amount to be sent from aberration detecting means to driving means, and an optimum output of a light source in correspondence thereto in the optical head device in accordance with the first embodiment of the present invention.

FIG. 2 is an illustration showing a relation between the driving amount to be sent from the aberration detecting means 12 to the driving means 7, and the optimum recording power of the light source 1 in correspondence thereto. The driving amount to be sent to the driving means 7 corresponds to a driving amount based on which the optical head device 101 is operated to reduce (e.g., minimize) the aberration detected by the aberration detecting means 12. As shown in FIG. 2, the relation between the output of the light source 1 and the driving amount to be sent to the driving means 7 is one to one.

A relation between the driving amount and the optimum recording power will be represented by a horizontally straight line as shown by the curve C1, if the actual aberration does not contain spherical aberration of the order higher than the order of aberration to be detected by the aberration detecting means 12 (e.g., third order, hereinafter, the order of aberration to be detected by the aberration detecting means 12 is referred to as "detected order"), and the wavefront converting means 7 can be properly operated by setting the driving amount appropriately, with the result that the spherical aberration of the detected order can not only be reduced, but also be constantly set to 0. In other words, if the above conditions can be satisfied, the optimum recording power may be set constant without depending on the driving amount. Actual aberration, however, contains aberration of the order higher than the detected order. Therefore, the optimum recoding power will be as depicted by the curve C, which is dependent on the driving amount, primarily resulting from aberration of the order higher than the detected order.

When aberration is generated, effective recording power on a central region of a spot of focus light formed on the data layer 9a or the like, which effectively contributes to data reading/writing is lowered, as the spot of focus light is enlarged. The lowering of the recording power on the effective region can be compensated by raising the output of laser light to be emitted from the light source 1. This means that the more the actual aberration is, the higher the optimum recording power is.

Figure 3:
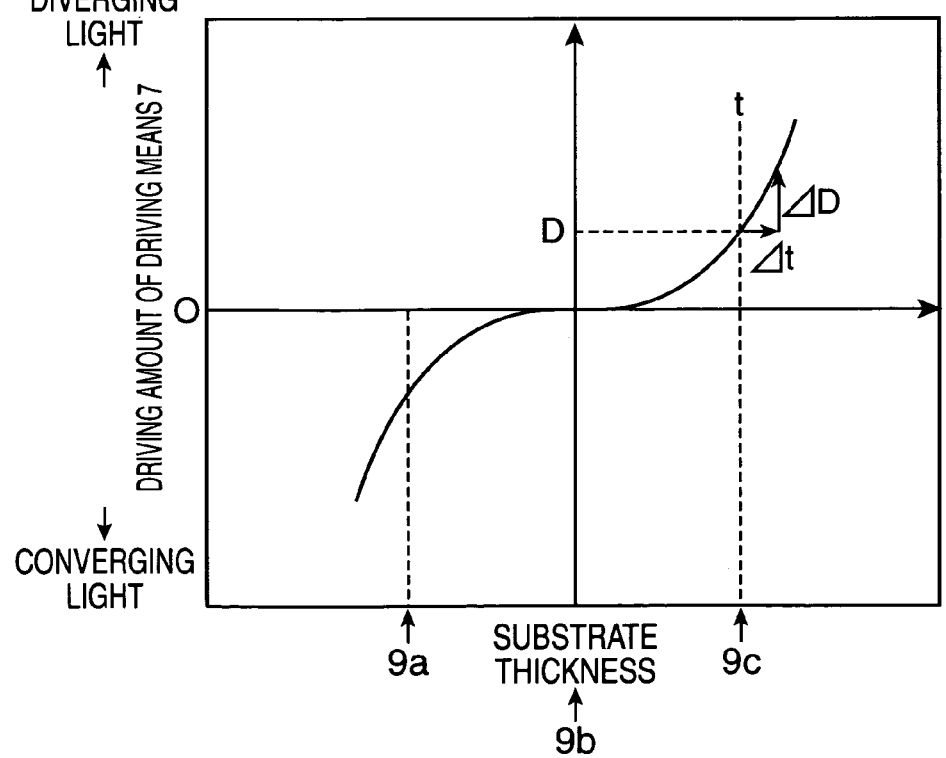
FIG. 3 is a graph showing a relation between a substrate thickness of an optical recording medium, and the driving amount to be inputted to the driving means in correspondence thereto in the optical head device in accordance with the first embodiment of the present invention.

The driving amount to be sent from the aberration detecting means 12 to the driving means 7 varies depending on the substrate thickness of the optical recording medium 9. FIG. 3 is a graph showing a relation between the substrate thickness of the optical recording medium 9, and the driving amount to be sent to the driving means 7 in correspondence thereto. The substrate thickness differs depending on which layer data is to be read from or written to by the optical head device 101, namely, on which data layer 9a, 9b, or 9c, the spot of focus light is to be irradiated. In view of this, as the data layer for data reading/writing is changed, the focusing lens 8 is moved forward or backward along the optical axis of the lens in such a manner as to follow the change of the data layer by focus control, which will be described later. Aberration, however, is not eliminated even by such a focus control. As exemplified in FIG. 3, even if the spherical aberration of the detected order with respect to the substrate thickness corresponding to the data layer 9b is 0 at the driving amount of 0, a certain driving amount is required to drive the wavefront converting means 7 if the target data layer is changed, because spherical aberration of the detected order is generated as the target data layer is changed, and driving of the wavefront converting means 7 is required to compensate for such spherical aberration. The wavefront converting means 7 is driven in such a direction as to cause diverging light to be incident on the focusing lens 8, as the target data layer is shifted in such a direction as to increase the substrate thickness, whereas the wavefront converting means 7 is driven in such a direction as to cause converging light to be incident on the focusing lens 8, as the target data layer is shifted in such a direction as to decrease the substrate thickness.

There exists a one-to-one relation between the substrate thickness and the driving amount, as exemplified in FIG. 3, irrespective of a fact as to whether the relation results from a difference in data layer or a variation in substrate thickness. Likewise, as exemplified in FIG. 2, there exists a one-to-one relation between the optimum recording power and the driving amount. The relation between the substrate thickness and the driving amount exemplified in FIG. 3 reflects a relation between the substrate thickness and spherical aberration of the detected order when the driving amount is 0. This means that information relating to the target data layer, substrate thickness variation, and spherical aberration of the detected order are integrally correlated to the driving amount, and accordingly, the relation between the driving amount and the optimum recording power has one-to-one correspondence. This analysis leads to a conclusion that the recording power of laser light can be set to an optimal value merely depending on the driving amount.

As exemplified in FIG. 3, in the case where the spot of focus light is to be incident on the data layer 9c, and there exists a substrate thickness variation Δt relative to the original substrate thickness t (e.g., average), the aberration detecting means 12 is driven in such a manner as to vary the driving amount from the driving amount D corresponding to the substrate thickness t by a driving amount ΔD along the curve in FIG. 3. Then, the output controlling means 13 shifts the optimum recording power from the power P corresponding to the driving amount D by ΔP corresponding to the varied driving amount ΔD along the curve C shown in FIG. 2, which illustrates a relation between the driving amount and the optimum recording power.

The relation between the optimum recording power and the driving amount to minimize the spherical aberration of the detected order, namely, the configuration of the curve C as exemplified in FIG. 2, depends on a structural difference such as the substrate thickness of each optical recording medium 9, the number of data layers constituting each optical recording medium 9, or characteristics variation of the optical head device 101 itself or a like factor. In view of this, it is more practical to acquire the relation between the optimum recording power and the driving amount by way of the aforementioned learning. The procedure on the learning will be described later in detail.

As shown in FIG. 3, the driving amount of the driving means 7 for correcting the spherical aberration generated on the optical recording medium 9 differs depending on which data layer of the optical recording medium 9 the spot of focus light is to be incident. Accordingly, knowing the driving amount of the driving means 7 makes it possible to grasp on which data layer the target focus light spot is located. Allowing the output controlling means 13 to receive the driving amount which is sent to the driving means 7 means that the output controlling means 13 receives information regarding which data layer 9a, 9b, or 9c of the optical recording medium 9 the spot of focus light is located, as well as information relating to the total aberration, which is the sum of third-order spherical aberration, and aberration resulting from a variation in substrate thickness of the target data layer.

The optical head device 101 in accordance with the first embodiment of the present invention is constructed such that the output of the light source 1 is controlled by correlating the driving amount to be sent from the aberration detecting means 12 to the driving means 7, to the relation between the driving amount and the optimum recording power of the light source 1 that has been acquired as learned data in the output controlling means 13.

Referring back to FIG. 1, the operation of the optical head device 101 is described along with the optical path and signal path. The light emitted from the light source 1 is rendered to parallel beams by the collimator lens 2, and has its optical path oriented toward the focusing lens 8 by the beam splitter 3. The wavefront converting means 4 turns the incoming parallel beams to outgoing parallel beams of a beam size different from that of the incoming parallel beams when a signal indicative of a correction amount (namely, driving amount) outputted from the aberration detecting means 12 is 0.

The light transmitted through the wavefront converting means 4 is focused on the data layer 9a, 9b, or 9c of the optical recording medium 9 by the focusing lens 8. The focusing lens 8 is so designed as to set the third-order spherical aberration to 0 when the light is focused on the data layer 9b at the driving amount of 0 (in this case, the spherical aberration of a higher order is minimized), with the result that third-order spherical aberrations are generated with respect to the data layer 9c having a substrate thickness larger than that of the data layer 9b, and the data layer 9a having a substrate thickness smaller than that of the data layer 9b. The light reflected from the optical recording medium 9 is impinged on the light detector 11 via the focusing lens 8, the wavefront converting means 4 and the beam splitter 3, and through the detection optical system 10. The light detector 11 is adapted to generate servo signals necessary for driving the focusing lens 8 with use of a focus error signal detection such as a well-known spot size detection method or three-beam method, and with use of a tracking error detecting method.

The aberration detecting means 12 detects spherical aberration, according to the known technique as having been employed in the conventional art, with use of the signals outputted from the light detector 11, and moves the diverging lens 6 in such a direction as to reduce (e.g., minimize) the spherical aberration. The driving amount outputted from the aberration detecting means 12 is sent to the output controlling means 13, as well as to the wavefront converting means 4 (driving means 7), so that the output controlling means 13 controls the output of the light source 1 based on the output sent from the aberration detecting means 12 (in this example, the driving amount that has been inputted to the driving means 7).

Figure 4:
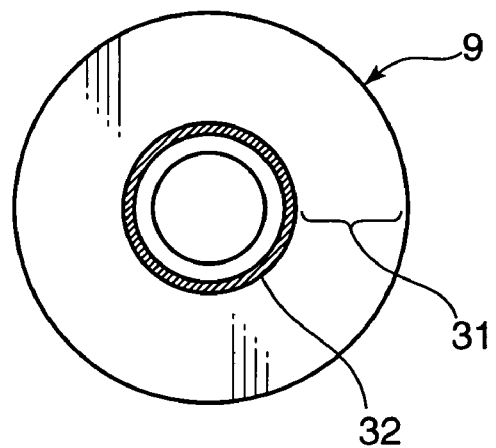
FIG. 4 is a schematic plan view of an optical recording medium 9.
Figure 5:
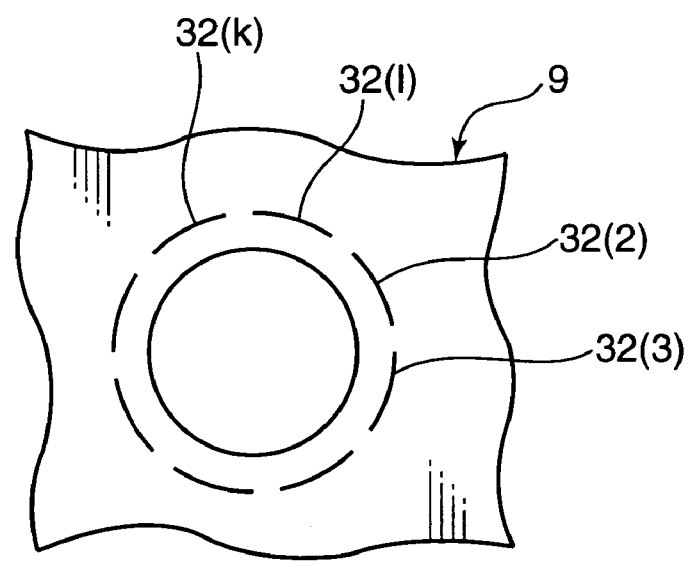
FIG. 5 is a partially enlarged plan view of the optical recording medium 9.

As described above, the output controlling means 13 acquires the relation between the driving amount to be sent from the aberration detecting means 12 to the driving means 7, and the optimum recording power through the learning operation of the learning means 51. FIG. 4 is a schematic plan view of the optical recording medium 9. The optical recoding medium 9 has a test recording region 32, in addition to a data recording region 31 for recording user data therein. The test recording region 32 is used to record specific data as test data for determining the quality of the recorded signals so as to implement a learning operation for acquiring an optimum recording condition. As shown in FIG. 5, the test data are recorded with different outputs in plural zones 32(1) through 32(K) of the test recording region 32.

Figure 6:
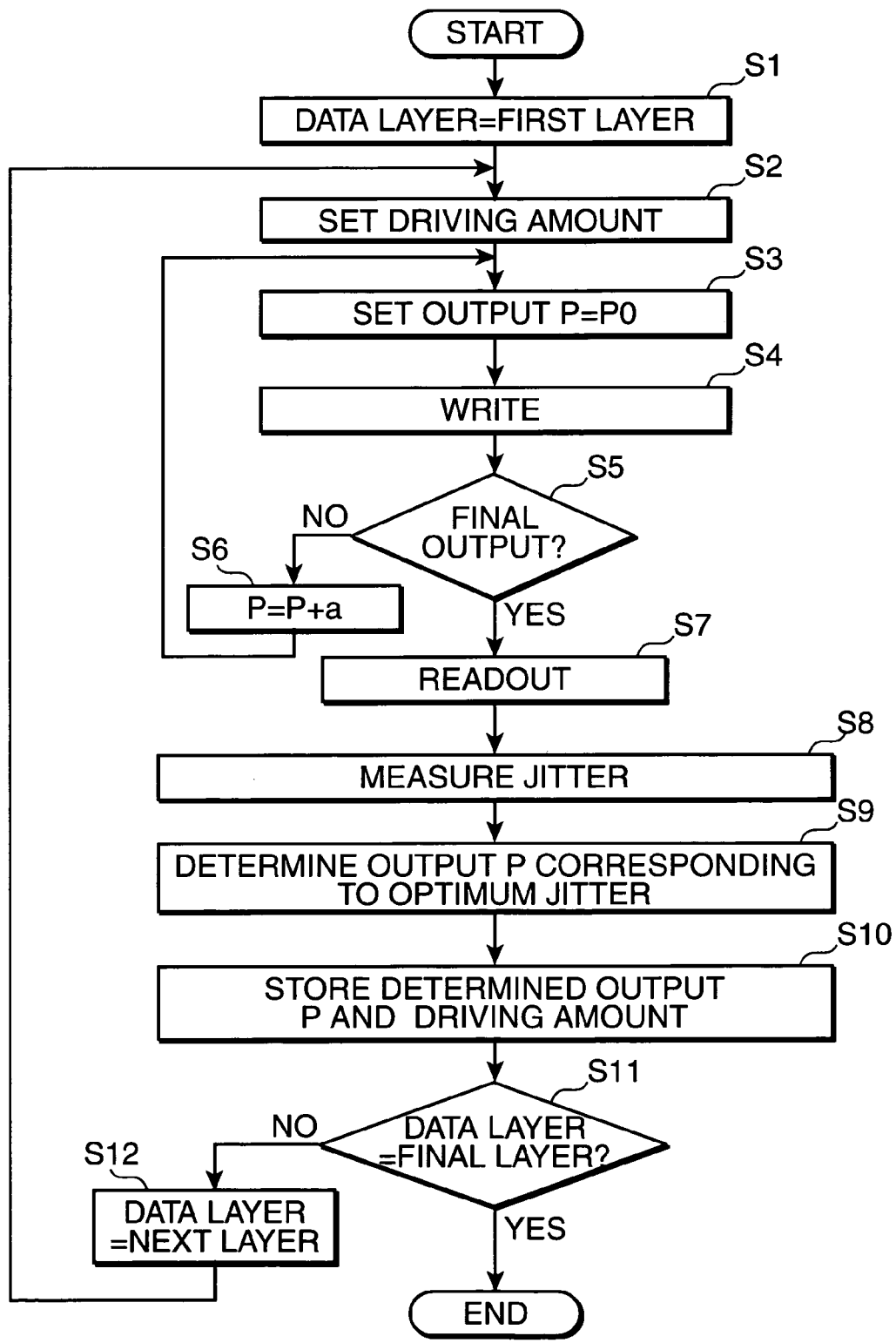
FIG. 6 is a flowchart showing a procedure of learning operation.

FIG. 6 is a flowchart showing a procedure of the learning operation to be implemented by the learning means 51. When the learning process of the learning means 51 is initiated, the learning means 51 designates the first layer (e.g., data layer 9a) as the target data layer for writing test data therein (Step S1). Next, the learning means 51 controls the aberration detecting means 12 to set the driving amount suitable for the designated data layer (Step S2). Thereby, the driving means 7 drives the wavefront converting means 4 in such a direction as to compensate for the spherical aberration of the detected order. Subsequently, the learning means 51 sets the output P of the light source 1 to the initial value P0 (Step S3). Then, the learning means 51 allows test data to be written in e.g., the zone 32(1) of the test recording region 32 (Step S4). Next, the learning means 51 judges whether the output P is a final output (Step S5). If it is judged that the output P is not the final output (NO in Step S5), the learning means 51 controls the light source 1 to raise the output P (Step S6), and implements the processes from Steps S3 through S5 again. That is, the learning means 51 executes writing of test data while raising the output P from the initial value P0 to the final value stepwise. Thus, the learning means 51 successively records the test data in, e.g., the zones 32(1) through 32(K) each time the output P is raised.

When the writing of test data is completed (YES in Step S5), the learning means 51 causes the light detector 11 to read out the test data successively from, e.g., the zones 32(1) through 32(K) (Step S7). Next, the learning means 51 measures jitter of each of the readout test data (varied amount of the reproduced data position relative to the reference clock) (Step S8). Then, the learning means 51 determines the output P corresponding to the optimum jitter (Step S9), and causes the learned data memory 52 to store the determined output P as the optimum recording power, in correlation with the driving amount (Step S10). Next, the learning means 51 judges whether the data layer is the final layer (Step S11). If it is judged that the target data layer is not the final layer (NO in Step S11), the learning means 51 designates a next layer as the target data layer (Step S12), and implements the process of Step S2 and thereafter. If it is judged that the data layer is the final layer (YES in Step S11), the learning means 51 terminates the learning operation.

Figure 7:
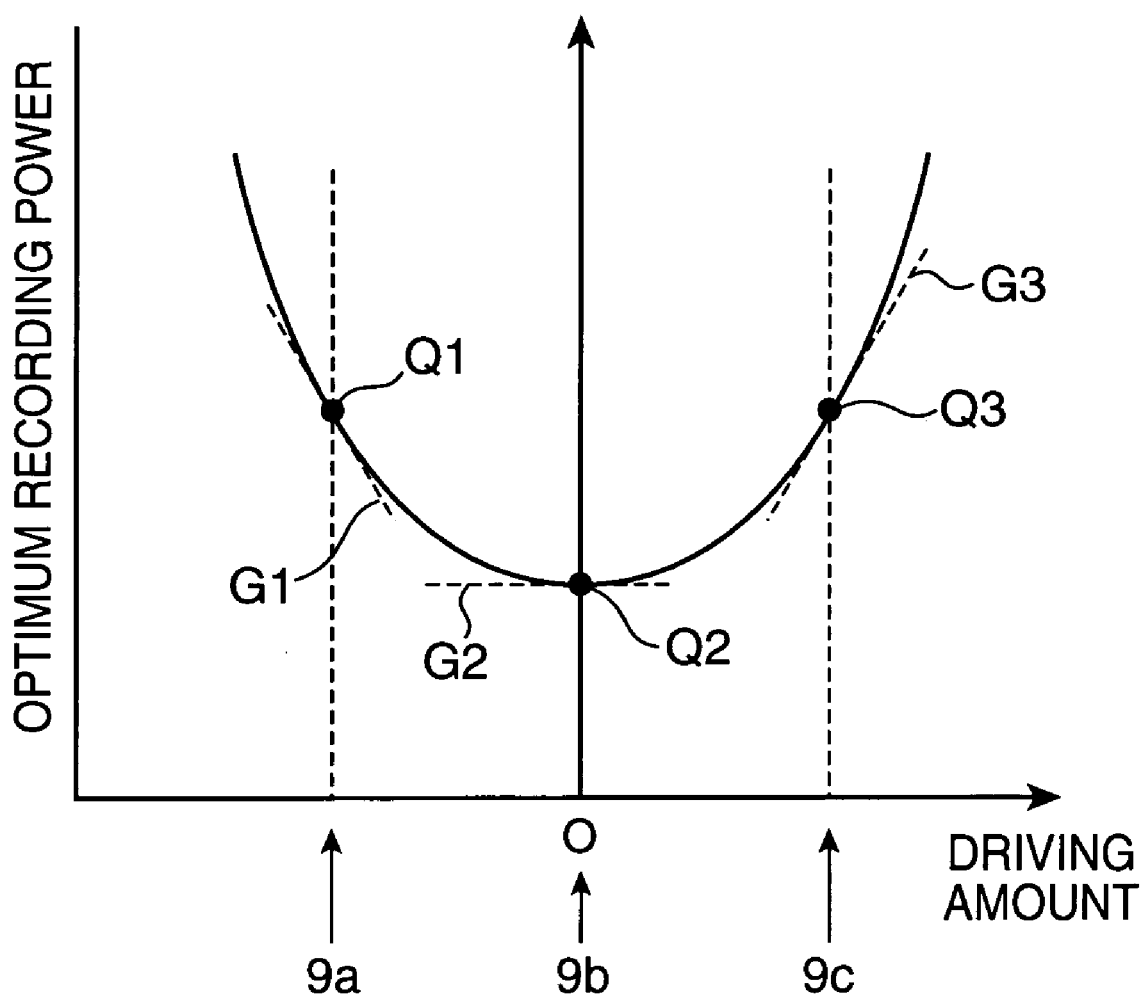
FIG. 7 is a graph showing a relation between a driving amount acquired by the learning, and an optimum recording power.

Thus, the optimum recording powers in correspondence to the respective driving amounts are acquired as learned data, and the learned data is stored in the learned data memory 52. In the case where the optical recording medium 9 has three layers, i.e., the data layers 9a, 9b, 9c, three sets of combinations relating to the relation between the driving amount and the optimum recording power are obtained, as represented by three data points Q1, Q2, Q3, as shown in FIG. 7, for example. In the learning, a variable component of the driving amount resulting from the substrate thickness variation, namely, the alternate current component of the driving amount (also, called as "high frequency component") of the driving amount is significantly small, because the zones 32(1) through 32(K) substantially cover one spiral track on the optical recording medium 9. As a result, as illustrated by the data points Q1, Q2, Q3 in FIG. 7, merely an invariable component of the driving amount, which is the direct current component of the driving amount corresponding to the difference in data layer, is acquired by the learning. Thus, the learning means 51 acquires a relation between the optimum recording power and the driving amount, which is exemplarily depicted by the curve in FIG. 7, by implementing data interpolation with use of polynomial expression or spline function based on the data points Q1, Q2, Q3. The obtained relation is stored in the learned data memory 52 as learned data, and is used in output control by the output controlling means 13.

Since the output controlling means 13 outputs the recording power depending on the learned data acquired through the learning, one-to-one relation is established regarding the total aberration and the optimum recording power with respect to each of the data layers. This makes it possible to adjust the degree of convergence or divergence of laser light incident on the focusing lens 8 with respect to each of the data layers 9a, 9b, 9c of the optical recording medium 9. This arrangement eliminates determination as to which data layer, 9a, 9b, or 9c of the optical recording medium 9 the spot of focus light is located, because the input to the output controlling means 13 (driving amount to be sent to the driving means 7) includes the information relating to which data layer 9a, 9b, or 9c of the optical recording medium 9 the spot of focus light is located, as well as the information relating to the spherical aberration.

In this way, acquiring the relation between the driving amount and the optimum recording power in advance by the initial learning enables to optimize the recording power with use of the simple program and to expedite startup of the optical head device without the need of independently acquiring information relating to the data layer for data recording, and without learning with respect to each of the data layers which has been required in the conventional art.

The above arrangement is advantageous in simplifying the relation between the substrate thickness deviation and recording compensation amount as compared with the conventional art where the recording power is controlled based on the aberration amount, because, in the above arrangement, recording compensation is implemented, as long as the driving amount is not 0 even if the detected aberration amount is 0.

Alternatively, the output control may be executed based on the product of the direct current component and the high frequency component of the driving amount for the following reason. When the driving amount is separated into the direct current component (corresponding to the driving amount D in FIG. 3), and the high frequency component (corresponding to the varied driving amount $\Delta D$ in FIG. 3) through a filter, as mentioned above, the direct current component corresponds to each of the data layers, and the high frequency component corresponds to the substrate thickness variation (corresponding to the substrate thickness variation $\Delta t$ in FIG. 3), arising from rotation of the optical recording medium. As exemplified in FIG. 7, gradients G1, G2, G3 of the curve at the respective data points Q1, Q2, Q3 are proportional to the driving amount, or at least increased along with increase of the driving amount. In view of this, it is possible to obtain a high frequency component of the optimum recording power with high precision by multiplying the direct current component of the driving amount by the high frequency component of the driving amount. As far as the curve exemplified in FIG. 7 is a curve of the second order (parabola), the gradients G1, G2, G3 are proportional to the driving amount. If the gradients G1 through G3 are proportional to the driving amount, the high frequency component (corresponding to $\Delta P$ in FIG. 2) of the optimum recording power is proportional to the product of the direct current component D of the driving amount and the high frequency component $\Delta D$ of the driving amount. Thus, the high frequency component of the optimum recording power is acquired with high precision.

Further, since the varied amount of the high frequency component is generally significantly small, the amplitude of the high frequency component can be enlarged by calculating the product of the high frequency component and the direct current component. This arrangement not only accomplishes control of light amount with high precision but also makes it possible to obtain information relating to the location of the target data layer for data recording/reproduction by calculating a maximum amplitude of the varied amount with respect to the product of the direct current component and the alternate current component in view of the fact that the magnitude of the direct current component differs depending on which data layer the spot of focus light is located.

Alternatively, separating the driving amount into a high frequency component of a significantly small value, and a direct current component of a significantly large value enables utilization of circuit configurations suitable for the respective components. Further alternatively, it may be possible to calculate the product of the high frequency component and the direct current component by applying a weighting factor either to the high frequency component or the direct current component, in place of calculating the product while setting the ratio of the high frequency component to the direct current component to 1:1.

Figure 8:
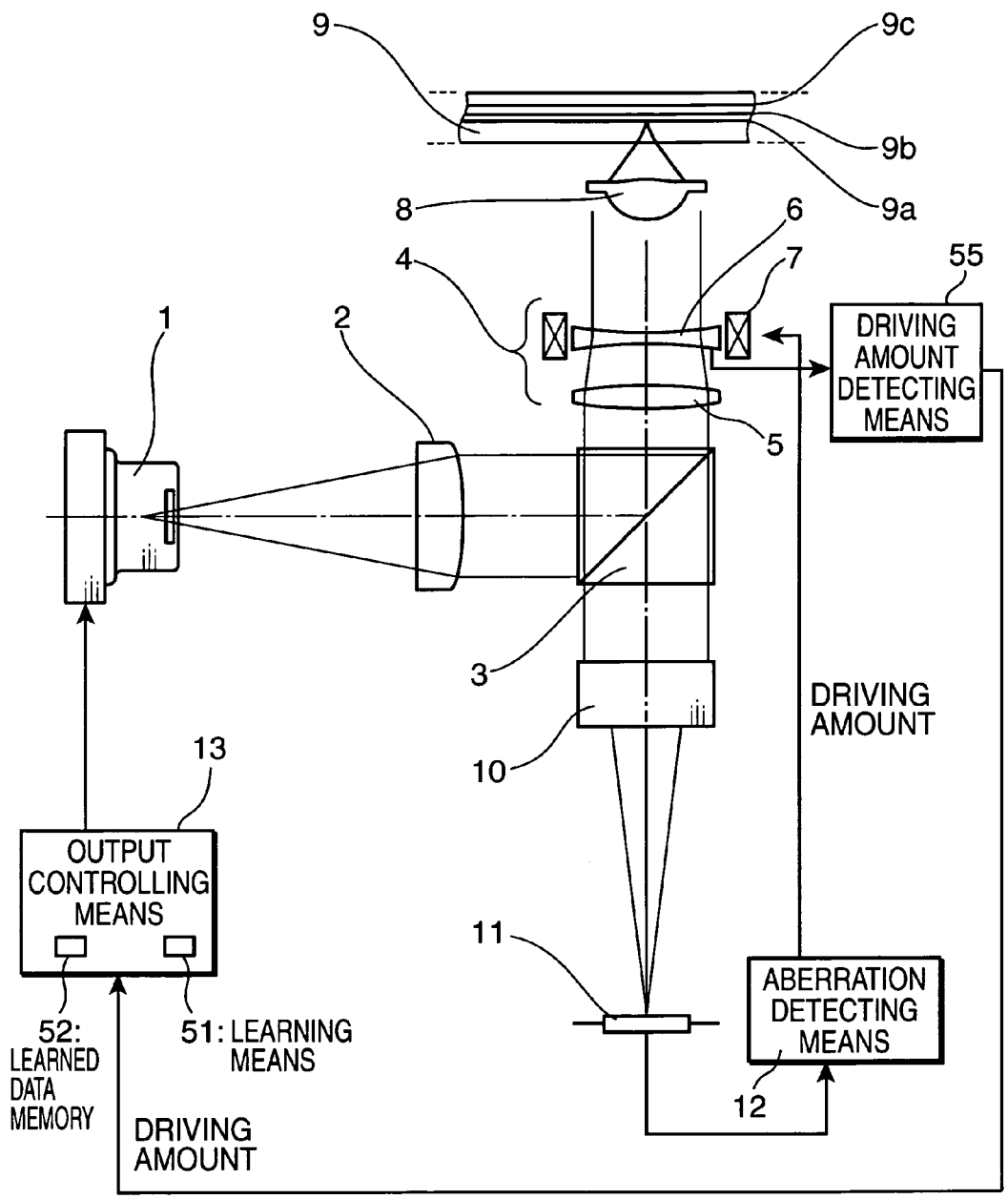
FIG. 8 is an illustration showing an altered arrangement of the optical head device in accordance with the first embodiment of the present invention.

The optical head device 101 feeds back, to the output controlling means 13, the driving amount which is outputted from the aberration detecting means 12 to the wavefront converting means 4 (more specifically, the driving means 7). Alternatively, there is proposed an optical head device 101A, as exemplified in FIG. 8. The altered arrangement is constructed such that driving amount detecting means 55 detects the driving amount of the diverging lens 6, and the driving amount is fed back to the output controlling means 13. It is possible to employ various well-known conventional movement detectors, as the driving amount detecting means 55.

Second Embodiment

Figure 9:
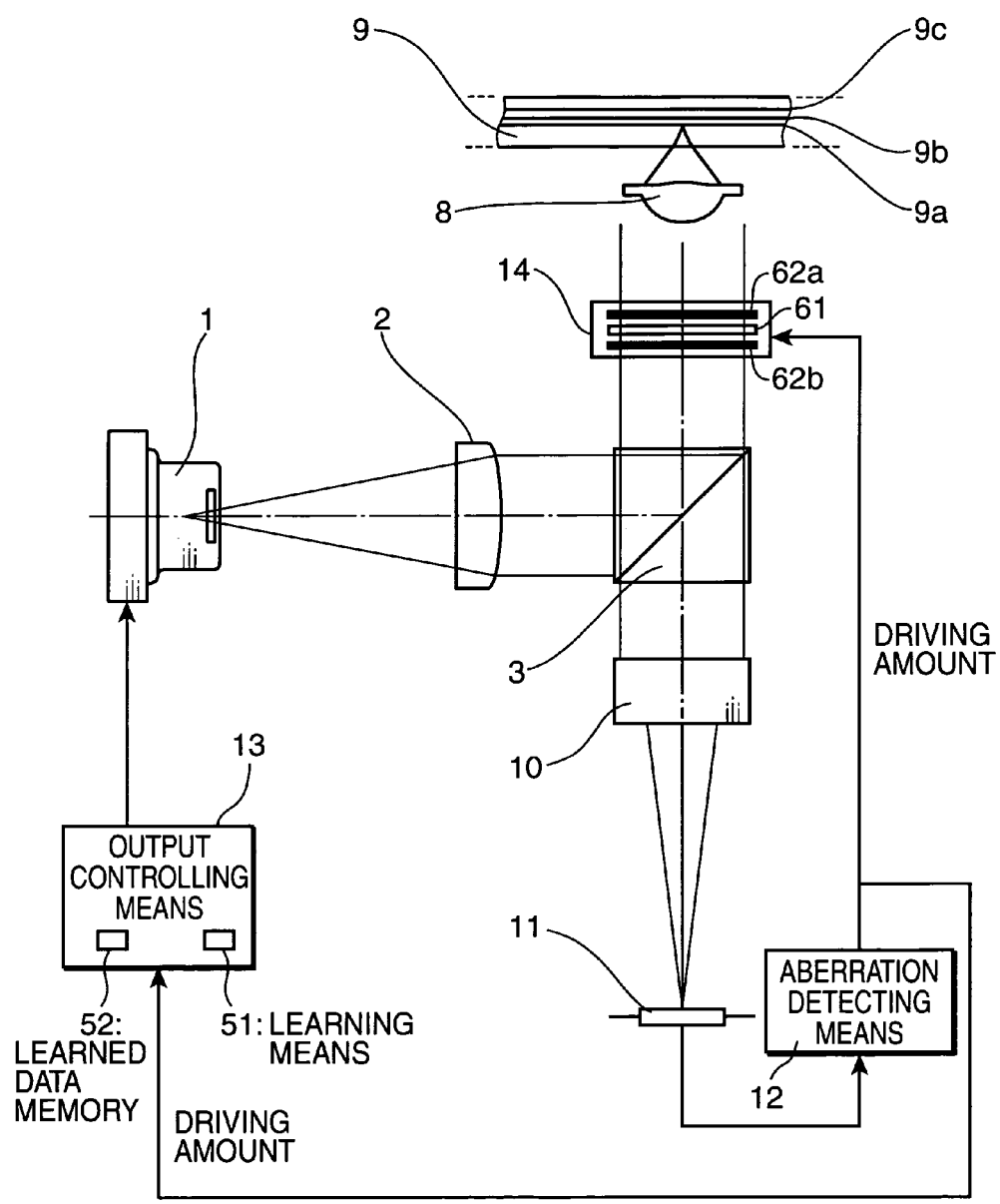
FIG. 9 is an illustration showing an arrangement of an optical head device in accordance with a second embodiment of the present invention.

FIG. 9 is an illustration showing an arrangement of an optical head device in accordance with a second embodiment of the present invention. Referring to FIG. 9, elements identical to or equivalent to those in FIG. 1 are denoted by the same reference numerals, and description thereof will be omitted herein. Wavefront converting means 14 shown in FIG. 9 is constructed such that a liquid crystal device 61 is provided between electrodes 62a and 62b. As is well known, the phase of linear polarized light can be changed by applying a voltage to the liquid crystal device. Accordingly, spherical aberration can be corrected by providing well-known coaxially aligned annular electrodes as the electrodes 62a, 62b, and by changing the drive voltage to be applied to each of the annular electrodes. Likewise, as is well known in the art, a coma aberration can be corrected by dividing each of the annular electrodes radially into plural zones. Since the optical head device 102 in accordance with the second embodiment of the present invention employs the wavefront converting means 14 provided with the liquid crystal device 61 as mentioned above, the optical head device 102 enables lowering of the power consumption, as well as correction of coma aberration.

Third Embodiment

Figure 10:
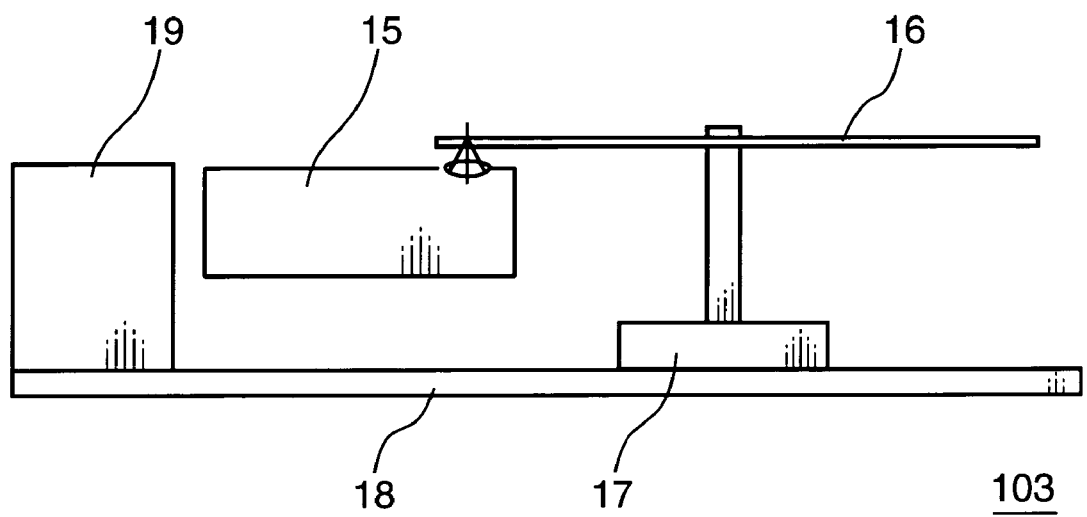
FIG. 10 is an illustration showing an arrangement of a multi-layered optical recording device in accordance with a third embodiment of the present invention.
Figure 11:
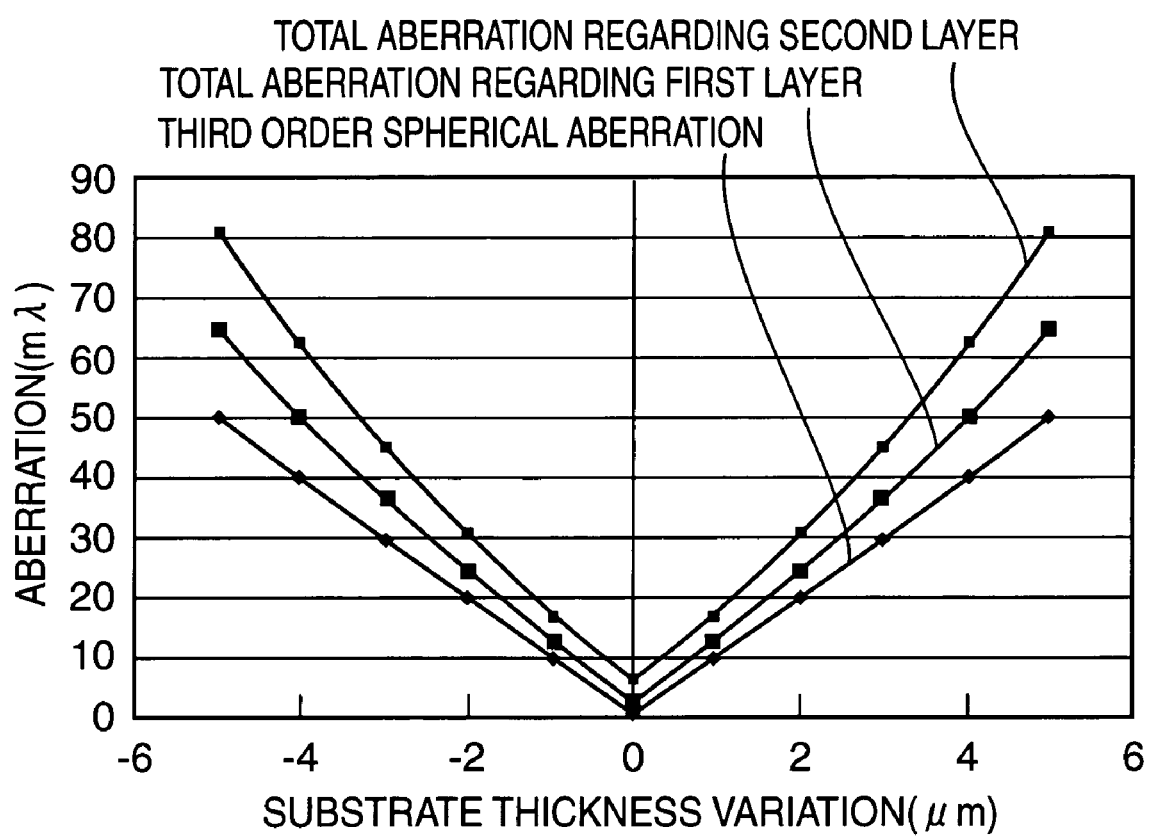
FIG. 11 is a graph showing a relation between a substrate thickness variation, and a third-order spherical aberration and total aberrations, based on a substrate thickness of an optical disk as a parameter.

An optical recording device using the inventive optical head device is described as a third embodiment of the present invention referring to FIG. 10. As shown in FIG. 10, the optical recording device 103 includes an optical head device 15, rotation driving means 17, a circuit substrate 18, and a power source 19. The optical head device 15 is the optical head device 101 or the optical head device 101A as the first embodiment, or an optical head device 102 as the second embodiment. The rotation driving means 17 has a motor for drivingly rotating an optical disk 16 as an example of the optical recording medium while supporting the optical disk 16. The optical disk 16 has multiple data layers.

The optical head device 15 sends, to the circuit substrate 18, a signal indicative of a position thereof relative to the optical disk 16. The circuit substrate 18 computes the signal, and outputs a signal for minutely moving the optical head device 15 or a focusing lens 8 in the optical head device 15. The optical head device 15 or the focusing lens 8 in the optical head device 15 implements focus servo control and tracking servo control with respect to the optical disk 16, and reads out data from, writes data in, or erases data from the optical disk 16 with use of the circuit substrate 18. The circuit substrate 18 has an electric circuit for controlling a focus servo driving mechanism (not shown) and a tracking servo driving mechanism (not shown), and for data reading, writing, or erasing. The power source 19 may be a connector to be connected with an external power source. The power source 19 supplies power to the circuit substrate 18, the driving mechanisms of the optical head device 15, the motor 17, and to a focusing lens driving device. As an altered form, a power source or a connection terminal to be connected with the external power source may be individually provided with respect to each of the driving circuits.

The optical storing device constructed with use of the inventive optical head device is advantageous in simplifying the learning regarding recording compensation with respect to each of data layers, and in simplifying the program for recording compensation, which makes it possible to expedite startup of the optical storing device.

BRIEF DESCRIPTION OF THE EMBODIMENTS

The following is a brief description on the embodiments of the present invention.

An optical head device comprises: a light source; focusing means which focuses light from the light source onto a desired data layer of an optical recording medium having multiple data layers; wavefront converting means provided between the light source and the focusing means; aberration detecting means which detects an aberration amount of a spot of the focus light on the desired data layer; and output controlling means which controls output of the light source, wherein the wavefront converting means is driven in such a manner as to reduce the aberration amount detected by the aberration detecting means, and the output controlling means holds learned data as to a relation between a driving amount to be inputted to the wavefront converting means, and the output of the light source, and controls the output of the light source based on the driving amount to be inputted to the wavefront converting means and the learned data, the driving amount being changed depending on the aberration of the focus light spot.

The above optical head device not only enables to simplify recording compensation with respect to the multiple data layers but also enables to learn the relation between the driving amount of the wavefront converting means and the output of the light source, in place of learning a relation between the aberration amount and the optimum recording compensation amount with respect to each of the data layers, as in the conventional art, by controlling the output of the light source with use of the output signal to be inputted to the wavefront converting means. This arrangement enables to shorten the required learning time and lessen the quantity of the program for the learning, thereby contributing to expedited startup of the optical head device.

Preferably, the optical head device further comprises driving amount detecting means which detects the driving amount to be inputted to the wavefront converting means, wherein the output controlling means controls the output of the light source based on the driving amount detected by the driving amount detecting means.

The above arrangement makes it possible to controllably optimize the power of the light source while correcting the spherical aberration depending on each of the data layers of the optical recording medium.

It is desirable that the output controlling means controls the output of the light source based on the product of a direct current component and an alternate current component of the driving amount to be inputted to the wavefront converting means.

The above arrangement enables to increase the amplitude of the high frequency component of the driving amount. This arrangement not only makes it possible to control the light amount with high precision, but also makes it possible to acquire the information relating to the location of the target data layer for data recording/reproduction by checking the maximum amplitude of the varied amount of the product of the direct current component and the alternate current component of the driving amount. Thus, the output controlling means enables to control the power of the light source to the optimum light amount depending on each of the data layers of the optical recording medium.

Preferably, the wavefront converting means is a liquid crystal device.

The above arrangement enables to controllably optimize the power of the light source while correcting the spherical aberration depending on each of the data layers of the optical recording medium.

Preferably, the wavefront converting means includes a plurality of lenses, and lens driving means which drives one of the plurality of lenses to change a distance between the one lens and the other one of the plurality of lenses, and the lens driving means is driven in such a manner as to reduce the aberration amount detected by the aberration detecting means.

The above arrangement enables to controllably optimize the power of the light source while correcting the spherical aberration depending on each of the data layers of the optical recording medium.

Preferably, the output controlling means controls the output of the light source based on the driving amount and the learned data so as to compensate for a spherical aberration of the order higher than a highest order of aberration compensatable by the wavefront converting means.

According to another aspect of the present invention, an optical recording device comprises: the aforementioned optical head device, and rotation driving means which rotates the optical recording medium.

The optical recording device not only enables to simplify recording compensation with respect to the multiple data layers, but also enables to learn the relation between the driving amount of the wavefront converting means and the output of the light source, in place of learning the relation between the aberration amount and the optimum recording compensation amount with respect to each of the data layers, as in the conventional art. This arrangement enables to shorten the required learning time and lessen the quantity of the program for the learning, thereby contributing to expedited startup of the optical recording device.

Further, provided is an optical recording method for recording information on an optical recording medium having multiple data layers with use of a focus light spot emitted from a light source. The method comprises the steps of learning in advance a relation between a driving amount by which wavefront converting means is to be operated so as to reduce an aberration of the focus light spot, and an output of the light source; detecting the aberration of the focus light spot; driving the wavefront converting means so as to reduce the aberration; and controlling the output of the light source based on the driving amount of the wavefront converting means.

The optical recording method not only enables to simplify recording compensation with respect to the multiple data layers, but also enables to learn the relation between the driving amount of the wavefront converting means and the output of the light source, in place of learning the relation between the aberration amount and the optimum recording compensation amount with respect to each of the data layers, as in the conventional art. This arrangement enables to shorten the required learning time and lessen the quantity of the program for the learning, thereby contributing to expedited startup of the optical recording device.

Although the present invention has been described in detail, the aforementioned description is merely an example in every aspect of the present invention, and the present invention is not limited thereto. It is to be construed that unillustrated numerous modifications and alterations will be embraced in the present invention, unless otherwise such modifications and alterations depart from the scope of the present invention.

EXPLOITATION IN INDUSTRY

The optical head device, the optical recording device, and the optical recording method of the present invention are industrially useful because they enable to acquire the optimum recording characteristics of an optical recording medium having multiple data layers, with respect to each of the data layers without increasing learning time required for learning a relation between aberration amount and optimum recording compensation with respect to the multiple data layers.

The invention claimed is:

1. An optical head device for use with an optical recording medium having multiple data layers, said optical head device comprising:
 a light source operable to output light;
 focusing means for focusing light outputted from the light source onto a desired data layer of the optical recording medium having multiple data layers;
 a wavefront converter provided between the light source and the focusing means;
 driving means for driving the wavefront converter;
 aberration detecting means for detecting an aberration amount of a spot of the light focused on the desired data layer and sending a driving amount to the driving means for driving the wavefront converter to reduce the detected aberration amount;

the driving means performing the driving of the wavefront converter according to the driving amount sent by the aberration detecting means in such a manner as to reduce the aberration amount detected by the aberration detecting means; and output controlling means for storing learned data indicating correlation between driving amounts of the wavefront converter and outputs of light of the light source, and controlling the light source so as to set the output of light outputted by the light source to an output of light indicated in the learned data as correlating to the driving amount sent by the aberration detecting means.

2. The optical head device according to claim 1, wherein the output controlling means controls the light source so as to control the output of light output by the light source based on the product of a direct current component and an alternate current component of the driving amount to be inputted to the wavefront converter.

3. The optical head device according to claim 1, wherein the wavefront converter is a liquid crystal device.

4. The optical head device according to claim 1, wherein the wavefront converter includes a plurality of lenses, and the driving means comprises lens driving means for driving one of the plurality of lenses to change a distance between the one lens and the other one of the plurality of lenses in such a manner as to reduce the aberration amount detected by the aberration detecting means.

5. The optical head device according to claim 1, wherein the output controlling means controls the light source so as to control the output of light outputted by the light source based on the driving amount and the learned data so as to compensate for a spherical aberration of the order higher than a highest order of aberration compensatable by the wavefront converter.

6. An optical recording device comprising:
the optical head device of claim 1; and
rotation driving means for rotating the optical recording medium.

7. An optical recording method for recording information on an optical recording medium having multiple data layers with use of a focus light spot emitted from a light source, the method comprising:
storing in advance learned data indicating correlation between outputs of light of the light source and driving amounts by which a wavefront converter is to be operated to reduce an aberration;
detecting the aberration amount of the focus light spot;
sending a driving amount to the wavefront converter for driving the wavefront converter to reduce the detected aberration amount;
driving the wavefront converter according to the sent driving amount so as to reduce the aberration; and
setting the output of light outputted by the light source to an output of light indicated in the learned data as correlating to the driving amount sent in said sending.

8. An optical head device for use with an optical recording medium having multiple data layers, said optical head comprising:
a light source operable to output light;
a focusing system operable to focus light outputted from the light source onto a desired data layer of the optical recording medium having multiple data layers;
a wavefront converter provided between the light source and the focusing system;
a wavefront converter driver;
an aberration detector operable to detect an aberration amount of a spot of the light focused on the desired data layer and to send a driving amount to the wavefront converter driver for driving the wavefront converter to reduce the detected aberration amount;
the wavefront converter driver being operable to drive the wavefront converter according to the driving amount sent by the aberration detector in such a manner as to reduce the aberration amount detected by the aberration detector; and
an output controller operable to store learned data indicating correlation between driving amounts of the wavefront converter and outputs of light of the light source, and to control the light source so as to set the output of light outputted by the light source to an output of light indicated in the learned data as correlating to the driving amount sent by the aberration detector.

9. The optical head device according to claim 8, further comprising a driving amount detector operable to detect the driving amount to be inputted to the wavefront converter, wherein the output controller is operable to control the light source so as to control the output of light outputted by the light source based on the driving amount detected by the driving amount detector.

10. The optical head device according to claim 8, wherein the output controller is operable to control the light source so as to control the output of light outputted by the light source based on the product of a direct current component and an alternate current component of the driving amount to be inputted to the wavefront converter.

11. The optical head device according to claim 8, wherein the wavefront converter is a liquid crystal device.

12. The optical head device according to claim 8, wherein the wavefront converter includes a plurality of lenses, and the wavefront converter driver includes a lens driver operable to drive one of the plurality of lenses to change a distance between the one lens and another one of the plurality of lenses in such a manner as to reduce the aberration amount detected by the aberration detector.

13. The optical head device according to claim 8, wherein the output controller is operable to control the light source so as to control the output of light outputted by the light source based on the driving amount and the learned data so as to compensate for a spherical aberration of the order higher than a highest order of aberration compensatable by the wavefront converter.

14. An optical recording device comprising:
the optical head device of claim 8; and
a rotation driver operable to rotate the optical recording medium.

15. The optical head device according to claim 1, wherein the output controlling means comprises a computer.

16. The optical head device according to claim 1, wherein the aberration detecting means comprises a computer.

17. The optical head device according to claim 8, wherein the wavefront converter driver comprises a voice coil motor.

18. The optical head device according to claim 8, wherein the output controller comprises a computer.

19. The optical head device according to claim 8, wherein the aberration detector comprises a computer.

20. An optical head device for use with an optical recording medium having multiple data layers, said optical head device comprising:
a light source operable to output light;
focusing means for focusing light outputted from the light source onto a desired data layer of the optical recording medium having multiple data layers;
a wavefront converter provided between the light source and the focusing means;

driving means for driving the wavefront converter;

aberration detecting means for detecting an aberration amount of a spot of the light focused on the desired data layer and sending a driving amount to the driving means for driving the wavefront converter to reduce the detected aberration amount;

the driving means performing the driving of the wavefront converter according to the driving amount sent by the aberration detecting means in such a manner as to reduce the aberration amount detected by the aberration detecting means;

driving amount detecting means for detecting an amount of the driving of the wavefront converter performed by the driving means; and output controlling means for storing learned data indicating correlation between amounts of driving of the wavefront converter and outputs of light of the light source, and controlling the light source so as to set the output of light outputted by the light source to an output of light indicated in the learned data as correlating to the amount of driving detected by the driving amount detecting means.

21. An optical head device for use with an optical recording medium having multiple data layers, said optical head comprising:

a light source operable to output light;

a focusing system operable to focus light outputted from the light source onto a desired data layer of the optical recording medium having multiple data layers;

a wavefront converter provided between the light source and the focusing system;

a wavefront converter driver;

an aberration detector operable to detect an aberration amount of a spot of the light focused on the desired data layer and to send a driving amount to the wavefront converter driver for driving the wavefront converter to reduce the detected aberration amount;

the wavefront converter driver being operable to drive the wavefront converter according to the driving amount sent by the aberration detector in such a manner as to reduce the aberration amount detected by the aberration detector;

a driving amount detector operable to detect an amount of the driving of the wavefront converter performed by the wavefront converter driver; and an output controller operable to store learned data indicating correlation between driving amounts of the wavefront converter and outputs of light of the light source, and to control the light source so as to set the output of light outputted by the light source to an output of light indicated in the learned data as correlating to the amount of driving detected by the driving amount detector.

* * * * *